(12) United States Patent
Knee

(10) Patent No.: US 10,082,888 B2
(45) Date of Patent: Sep. 25, 2018

(54) STYLUS MODES

(75) Inventor: Derek Leslie Knee, Fort Collins, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 325 days.

(21) Appl. No.: 12/882,518

(22) Filed: Sep. 15, 2010

(65) Prior Publication Data

US 2012/0062520 A1    Mar. 15, 2012

(51) Int. Cl.
  *G09G 1/00*    (2006.01)
  *G06F 3/0354*   (2013.01)
  *G06F 1/32*    (2006.01)

(52) U.S. Cl.
  CPC ........ *G06F 3/03545* (2013.01); *G06F 1/3259* (2013.01); *Y02D 10/155* (2018.01)

(58) Field of Classification Search
  USPC ........................................ 345/156, 178, 179
  See application file for complete search history.

(56) References Cited

U.S. PATENT DOCUMENTS

| | | | |
|---|---|---|---|
| 7,199,783 B2* | 4/2007 | Wenstrand et al. | 345/156 |
| 7,477,242 B2 | 1/2009 | Cross et al. | |
| 2007/0013658 A1 | 1/2007 | Chien | |
| 2007/0140776 A1* | 6/2007 | Lapstun et al. | 401/195 |
| 2008/0198134 A1* | 8/2008 | Huang et al. | 345/166 |
| 2008/0297487 A1* | 12/2008 | Hotelling et al. | 345/173 |
| 2009/0273570 A1 | 11/2009 | Degner et al. | |
| 2009/0273584 A1* | 11/2009 | Staton et al. | 345/178 |
| 2009/0289908 A1 | 11/2009 | Chen et al. | |

FOREIGN PATENT DOCUMENTS

| | | |
|---|---|---|
| CN | 1412664 | 4/2003 |
| CN | 1519682 | 8/2004 |
| EP | 0171747 A2 | 2/1986 |

OTHER PUBLICATIONS

"DuoSense® Pen, Touch & Multi-Touch Digitizer", Retrieved at << http://www.n-trig.com/Data/Uploads/Misc/DuoSense010609Broch.pdf >>, pp. 4.
"EMR® Pen", Retrieved at << http://www.wacom-components.com/technologies/EMRpen/>>, Aug. 31, 2010, pp. 3.
"Foreign Office Action", Chinese Application No. 201110289011.2, dated Oct. 18, 2013, 15 Pages.
"Foreign Office Action", CN Application No. 201110289011.2, dated May 12, 2014, 13 Pages.
"Third Office Action Issued in Chinese Patent Application No. 201110289011.2", dated Nov. 21, 2014, 14 Pages.
"Foreign Office Action", CN Application No. 201110289011.2, dated May 21, 2015, 18 pages.
"Foreign Notice of Allowance", CN Application No. 201110289011.2, dated Oct. 27, 2015, 4 Pages.

* cited by examiner

*Primary Examiner* — Michael Faragalla
(74) *Attorney, Agent, or Firm* — Rainier Patents, P.S.

(57) ABSTRACT

Stylus modes are described. In implementations, one or more sensors of a stylus are used to detect that contact with a user has ceased. A battery-conservation mode is entered by the stylus responsive to the use of the sensors.

20 Claims, 5 Drawing Sheets

STYLUS MODES

BACKGROUND

The amount of functionality that is available from computing devices is ever increasing, such as from mobile devices, game consoles, televisions, set-top boxes, personal computers, and so on. Additionally, the techniques that may be employed to interact with the computing devices is also ever increasing.

For example, users traditionally interacted with computing devices using keyboards and a mouse. The keyboard was typically used to enter text whereas the mouse was used to control a cursor to navigate through a user interface of the computing device as well as initiate actions, e.g., launching applications and so on. Additional techniques were subsequently developed, such as through support of a stylus to enter text, navigate through user interfaces, and so on. However, traditional techniques that were used to power the stylus were inefficient, thereby resulting in reduced efficiency of the stylus as well as interrupting use of the stylus to change batteries. Other techniques used today include electromagnetically charging the pen to supply electrical energy to the pen for the subsequent generation of reference signals and data transmission back from the pen. This scheme requires the use of time multiplexing of the charging cycle with the operation cycle and as a result limits the response time and report rate of the pen.

SUMMARY

Stylus modes are described. In implementations, one or more sensors of a stylus are used to detect that contact with a user has ceased. A battery-conservation mode is entered by the stylus responsive to the use of the sensors.

In implementations, an apparatus includes a housing shaped to assume a form of a stylus, one or more sensors disposed proximal to the housing, and one or more modules within the housing. The one or more modules are operable to enter an active mode to assist provision of one or more inputs to a computing device responsive to detection of contact or proximity by a user with the one or more sensors.

In implementations, an active mode is entered by a stylus responsive to detection of contact with a user, the active mode configured to make functionality disposed within the stylus active that is operable to assist an ability of a computing device to recognize location of the stylus. A battery-conversation mode is entered by a stylus responsive to detection that contact with a user has ceased.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

A stylus (e.g., a digitizer pen) may involve active circuitry within the stylus for recognition by a computing device, such as to assist the computing device in recognizing an XY location on a display device of the computing device. Traditional techniques that were used to power the stylus, however, were inefficient and therefore could waste energy of the stylus, which could have a variety of undesirable effects.

Stylus mode techniques are described. In implementations, a stylus employs one or more sensors that are configured to detect when the stylus is being grasped by a user. For example, the sensors may be positioned to detect that the stylus is being held in a position typically employed to use the stylus in conjunction with a computing device, e.g., to write, navigate through a user interface, and so on. The stylus may also employ one or more modules that are configured to enter different modes responsive to this detection, such as to enter a battery-conservation mode in which a portion of the active circuitry of the stylus is disabled when the sensors indicate that the stylus is not being held by a user. Further, the battery-conservation mode may employ a variety of sub-modes to further conserve the battery, such as by changing a frequency at which the sensors are utilized, e.g., monitored. Further discussion of stylus modes may be found in relation to the following sections.

In the following discussion, an example environment is first described that is operable to employ the stylus techniques described herein. Example illustrations of the techniques and procedures are then described, which may be employed in the example environment as well as in other environments. Accordingly, the example environment is not limited to performing the example techniques and procedures. Likewise, the example techniques and procedures are not limited to implementation in the example environment.

Example Environment

Figure 1:
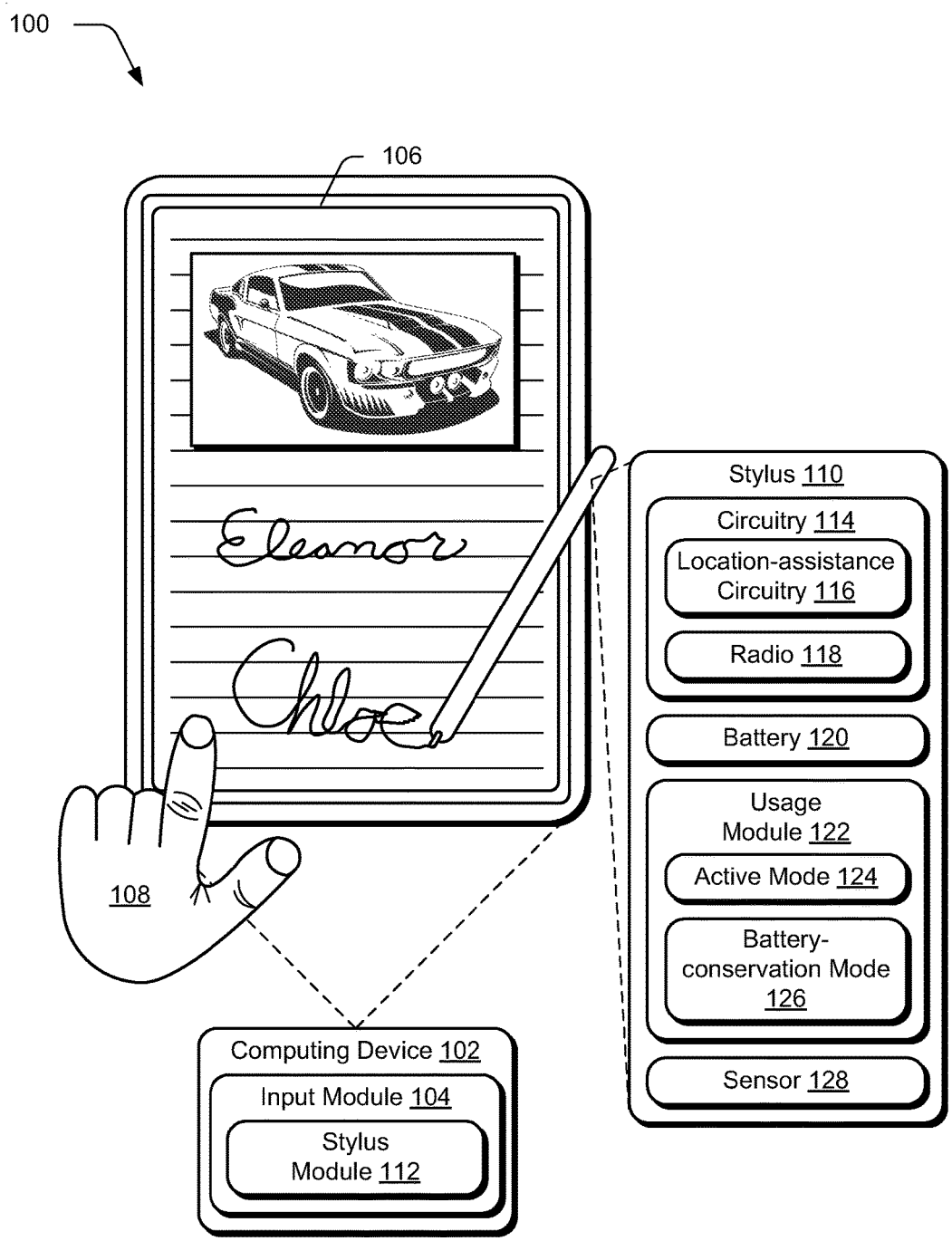
FIG. 1 is an illustration of an environment in an example implementation that is operable to employ stylus mode techniques described herein.

FIG. 1 is an illustration of an environment 100 in an example implementation that is operable to employ stylus techniques. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is illustrated as including an input module 104. The input module 104 is representative of functionality relating to inputs of the computing device 102. For example, the input module 104 may be configured to receive inputs from a keyboard, mouse, to identify gestures and cause operations to be performed that correspond to the gestures, and so on. The inputs may be identified by the input module 104 in a variety of different ways.

For example, the input module 104 may be configured to recognize an input received via touchscreen functionality of a display device 106, such as a finger of a user's hand 108 as proximal to the display device 106 of the computing device 102, from a stylus 110, and so on. The input may take a variety of different forms, such as to recognize movement of the stylus 110 and/or a finger of the user's hand 108 across the display device 106, such as a tap, drawing of a line, and so on. In implementations, these inputs may be recognized as gestures.

A variety of different types of gestures may be recognized, such a gestures that are recognized from a single type of input (e.g., touch gestures) as well as gestures involving multiple types of inputs. For example, the computing device 102 may be configured to detect and differentiate between a touch input (e.g., provided by one or more fingers of the user's hand 108) and a stylus input (e.g., provided by a stylus 110). The differentiation may be performed in a variety of ways, such as by detecting an amount of the display device 108 that is contacted by the finger of the user's hand 108 versus an amount of the display device 106 that is contacted by the stylus 110. Differentiation may also be performed through use of a camera to distinguish a touch input (e.g., holding up one or more fingers) from a stylus input (e.g., holding two fingers together to indicate a point) in a natural user interface (NUI). A variety of other example techniques for distinguishing touch and stylus inputs are contemplated, further discussion of which may be found in relation to FIG. 6.

Thus, the input module 104 may support a variety of different gesture techniques by recognizing and leveraging a division between stylus and touch inputs. For instance, the input module 104 may be configured to recognize the stylus as a writing tool, whereas touch is employed to manipulate objects displayed by the display device 108. Consequently, the combination of touch and stylus inputs may serve as a basis to indicate a variety of different gestures. For instance, primitives of touch (e.g., tap, hold, two-finger hold, grab, cross, pinch, hand or finger postures, and so on) and stylus (e.g., tap, hold-and-drag-off, drag-into, cross, stroke) may be composed to create a space involving a plurality of gestures. It should be noted that by differentiating between stylus and touch inputs, the number of gestures that are made possible by each of these inputs alone is also increased. For example, although the movements may be the same, different gestures (or different parameters to analogous commands) may be indicated using touch inputs versus stylus inputs.

The computing device 102 is further illustrated as including a stylus module 112. The stylus module 112 is representative of functionality of the computing device relating to the stylus 110. For example, the stylus module 112 may be configured to perform one or more actions responsive to the stylus 110, such as to draw lines as illustrated by the handwritten freeform lines in the second display device 114 that illustrate "Eleanor" and "Chloe."

Thus, the stylus module 112 may be configured to perform a variety of different writing operations, such as to draw a line to mimic a pencil, pen, brush, and so on. The stylus module 112 may also recognize the stylus 110 to perform erase operations, such as to mimic a rubber eraser and erase portions of a user interface. Thus, the stylus module 112 may provide interaction via the stylus 110 that is intuitive and natural to a user.

To increase an ability of the stylus module 112 to recognize the stylus 110, the stylus 110 may include a variety of different types of circuitry 114. For example, the circuitry 114 may include location-assistance circuitry 116 to aid the stylus module 112 in determining an XY location of the stylus 110 in relation to the display device 106. In an implementation, the circuitry may also include a radio 118 to support communication with the stylus module 112, such as to communicate data used in determination of the XY location. To power the circuitry 114, the stylus 110 includes a battery 120.

The stylus 110 is also illustrated as including a usage module 122. The usage module 122 is representative of functionality of the stylus 110 to enter different usage modes. For example, the usage module 122 may support an active mode 124 in which circuitry 114 of the stylus 110 is made active and therefore permitted to consume power from the battery 120. Thus, the circuitry 114 is available for use, such as to assist in providing an XY location to the computing device 102.

The usage module 122 may also support a battery-conservation module 126 to conserve power of the battery 120, such as to make circuitry 114 such as the location-assistance circuitry 116, the radio 118, and so on inactive to minimize consumption of the battery 120. In this way, the usage module 122 may conserve resources of the battery 120 yet enable functionality of the circuitry 114.

A variety of different techniques may be employed by the usage module 112 to determine when to switch between the modes. For example, the usage module 112 may employ a sensor 128 to determine whether a user's hand 108 has grasped the stylus 110. The usage module 122 may then enter the active mode 124 when the stylus is grasped and enter the battery-conservation mode 126 when the stylus is not. The sensors 128 may assume a variety of different configurations to detect the user's hand 108, further discussion of which may be found in relation to the following figures.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the stylus mode techniques described below are platform-independent, meaning that the techniques may be implemented on a variety of commercial computing platforms having a variety of processors.

Figure 2:
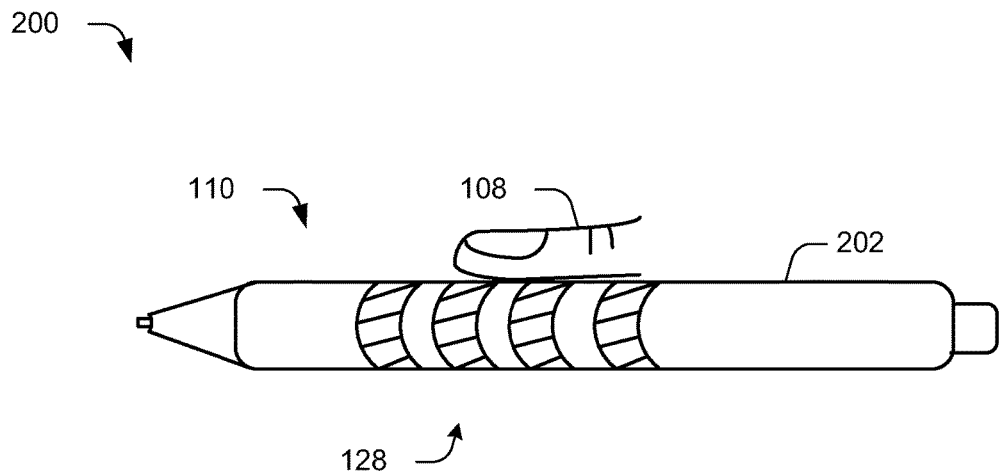
FIG. 2 depicts a stylus of FIG. 1 in an example implementation showing an example configuration of sensors that are usable to detect when the stylus is being grasped by a user.

FIG. 2 depicts the stylus 110 of FIG. 1 in an example implementation 200 showing an example configuration of the sensors 128 that is usable to detect when the stylus 110 is being grasped by a user. In this example, the stylus 110 is formed to include a housing 202 shaped to mimic a writing implement, e.g., a pen in the illustrated example although other configurations are also contemplated.

The housing 202 includes the sensors 128, which is this instance are arranged as bands (e.g., rings) that are generally perpendicular to a longitudinal axis of the stylus. In this instance, a finger of the user's hand 108 is illustrated as being disposed across two or more of the sensors 128, which may therefore be detected by the sensors 128 and communicated to the usage module 112. From this, the usage module 122 may determine that the stylus 110 is being grasped and therefore enter the active mode 124, if not already in an active mode 124.

Figure 3:
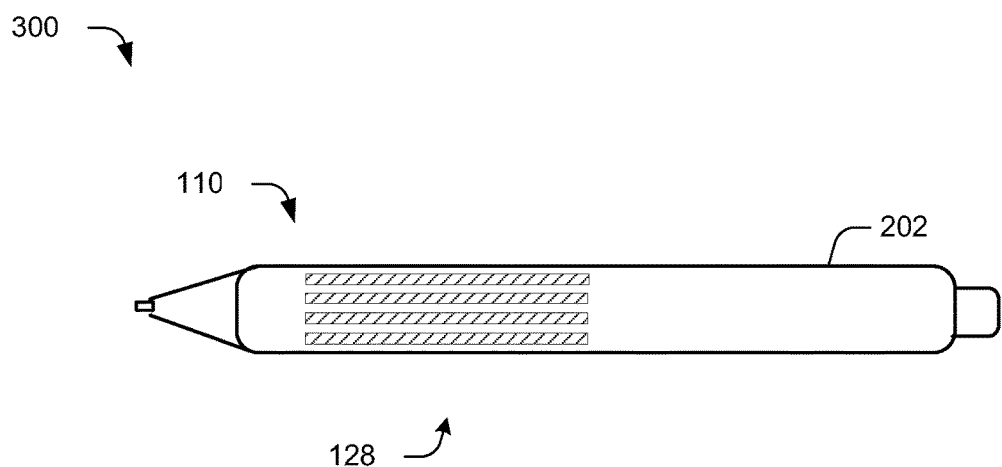
FIG. 3 depicts the stylus of FIG. 1 in another example implementation showing an example configuration of sensors that are usable to detect when the stylus is being grasped by a user.

FIG. 3 depicts the stylus 110 of FIG. 1 in another example implementation 300 showing an example configuration of the sensors 128 that is usable to detect when the stylus 110 is being grasped by a user. In this example, the housing 202 of the stylus 110 includes sensors 128 that are arranged as following a general longitudinal axis of the stylus 110. Again, the sensors 128 may be configured to detect a finger of the user's hand 108 as being disposed proximal to two or more of the sensors 128. In other implementations, a single sensor 128 may also be used to detect one or more fingers of the user's hand 108.

Additionally, the sensors 128 and the usage module 122 may be configured to differentiate from when the stylus 110 is merely being touched versus grasped as a writing implement by the user's hand 108. For example, the sensors 128 may be arranged on the housing 202 at points that are likely to be encountered by a plurality of portions of the user's hand 108, e.g., fingers, a thumb, resting on a top of a first made by the user's hand 108, and so on.

Because user's hands and grasping motions may differ, the usage module 122 may support a calibration operation in which the usage module 122 detects how a particular user typically grasps the stylus 110 to write, navigate, and so on. The usage module 122 may then model this detection to serve as a basis of future determination of whether the stylus 110 is likely being grasped by the user. Further, the usage module 122 may incorporate one or more heuristic techniques to update the model by monitoring continued usage of the stylus 110 by a user.

The sensors 128 may also employ a variety of different techniques to detect the user's hand 108. For example, the sensors 128 may be configured as conductive strips to detect portions of the user's hand 108 that are used to grasp the stylus 110. Additionally, the sensors 128 may employ capacitive, resistive, and other techniques (e.g., photographic, positional, pressure, and so on) to detect when the user is holding the stylus 110. For instance, the sensors 128 may be activated by a change in impedance (e.g., moisture or capacitive) so as to provide an ability to detect a user's hand 108 when wearing gloves.

The sensors may be exposed or hidden beneath the housing 202 of the stylus 110. Further, as shown in FIGS. 2 and 3 the sensors 128 may employ patterns that are arranged so as to avoid incorrect detection, e.g., detection when the stylus 110 is disposed next to a metallic object. Also, the sensors 128 may be grouped into separate sets and monitored together to promote a likelihood of detection that the user intended to use to stylus 110 to interact with the computing device 102 and lessen a likelihood of false positives.

Figure 4:
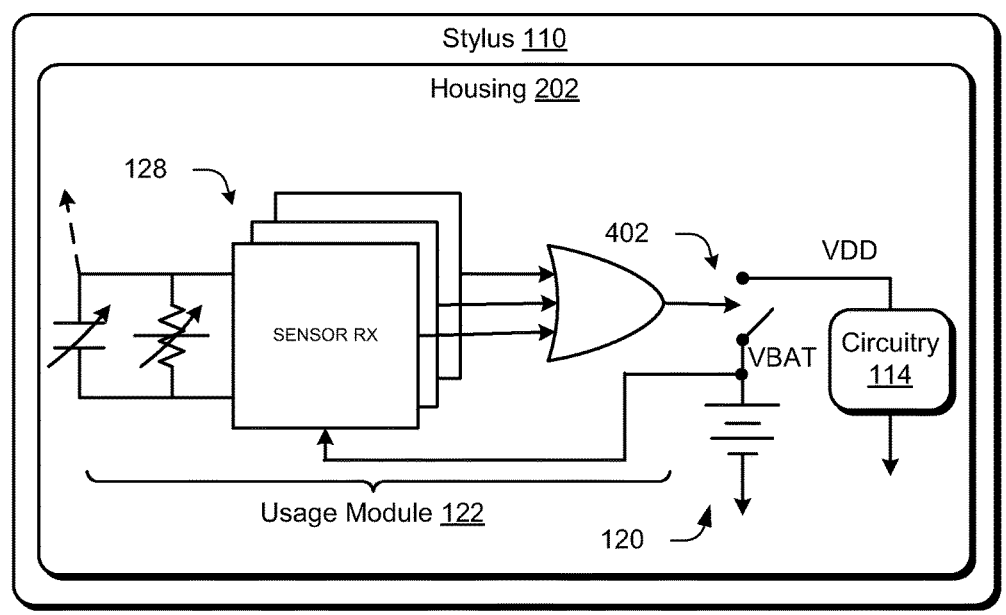
FIG. 4 is a block diagram depicting an example implementation of a usage module having sensors, a battery, and circuitry disposed within a housing of the stylus of FIG. 1.

FIG. 4 is a block diagram depicting an example implementation 400 of the usage module 122 having the sensors 128, the battery 120, and the circuitry 114 of the stylus 110 of FIG. 1. The stylus 110 is illustrated as including a housing 202. Disposed within the housing is a usage module 122 which in this instance includes a plurality of sensors 122.

The usage module 122 is illustrated as including a switch 402 to control access of the circuitry 114 to the battery 120, such as the location-assistance circuitry 116 and radio 118. A variety of other examples are also contemplated, such as to implement the battery-conservation mode 126 in which the circuitry goes into standby to reduce but not eliminate consumption of power from the battery 120. Further discussion of stylus modes may be found in relation to the following procedure.

Example Procedures

The following discussion describes stylus mode techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the example implementations of 200-400 of FIGS. 2-4.

Figure 5:
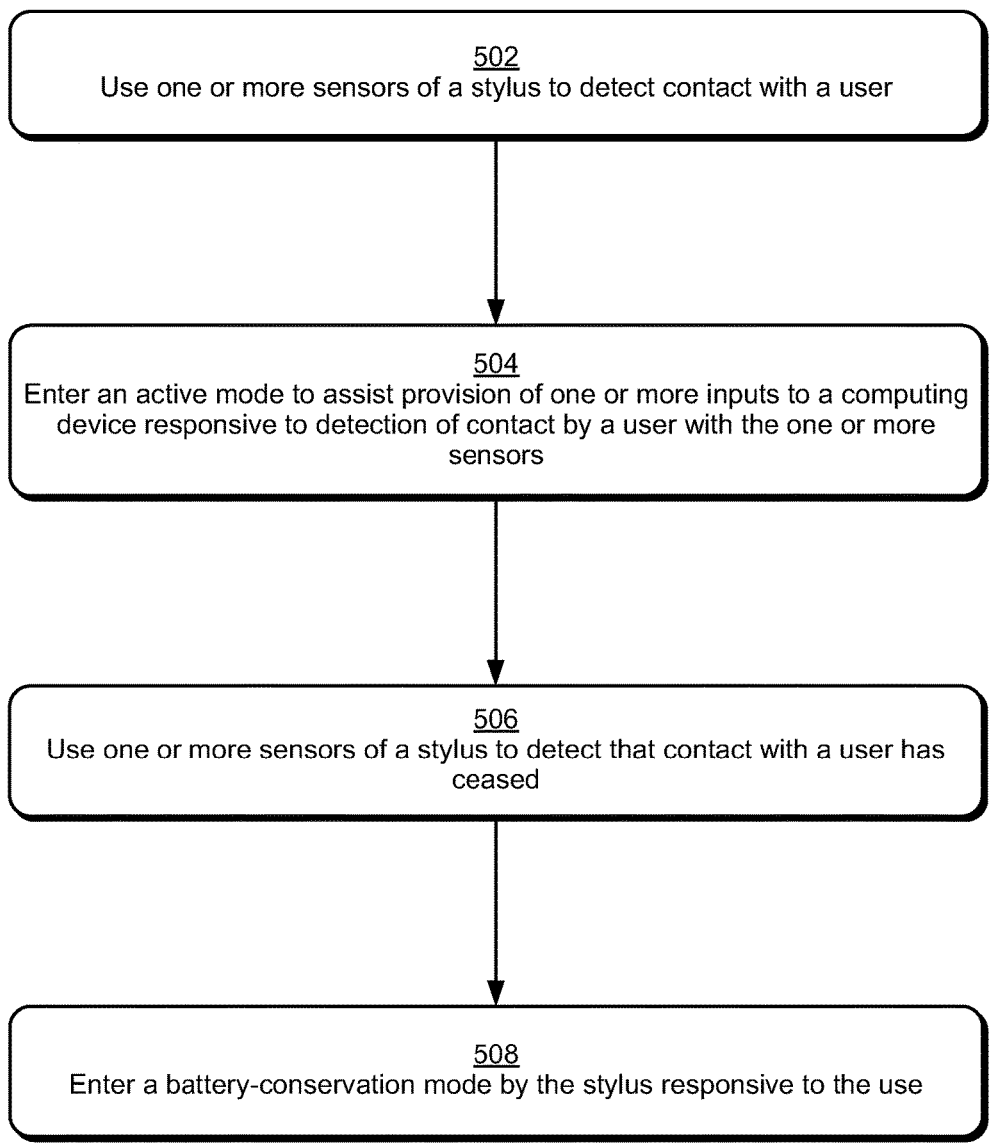
FIG. 5 is a flow diagram depicting a procedure in an example implementation in which different modes are entered dependent on whether a stylus is or is not being grasped by a user.

FIG. 5 depicts a procedure 500 in an example implementation in which different modes are entered dependent on whether a stylus is or is not being grasped by a user. One or more sensors of a stylus are used to detect contact with a user (block 502). The sensors, for instance, may employ conductive, resistive, inductive, optical, pressure, and other techniques to determine that the stylus is being grasped by a user.

An active mode is entered to assist provision of one or more inputs to a computing device responsive to detection of contact by a user with the one or more sensors (block 504). The stylus, for instance, may be configured as a digitizer pen that is configured to include circuitry to communicate with the computing device 102 via a radio to assist in providing XY coordinates. The XY coordinates, for instance, may describe a location of the stylus 110 with respect to a display device 106.

The one or more sensors of the stylus may also be used to detect that contact with a user has ceased (block 506). The user, for instance, may set the stylus 110 down after entering text, navigating through a user interface, and so on.

Accordingly, a battery-conservation mode is entered by the stylus responsive to the use (block 508), such as by reducing or even eliminating access to one or more circuits of the stylus 110 to the battery 120.

Additionally, the battery-conservation mode may support a variety of sub-modes to further conserve the battery 120. In an implementation, the usage module 122 may enter the different sub-modes at different times in which each sub-mode utilizes a different frequency for detecting a user through use of the sensors 128. For example, a first one of the sub-modes may be entered between zero and ten seconds in which the usage module 122 utilizes the sensors 128 to detect the user's hand 108 every quarter of a second. Therefore, the usage module 122 is "ready" is the user picks up the stylus after setting it down for a brief moment in time. After ten seconds, the usage module 122 may enter another sub-mode in which the frequency of detection using the sensors 128 is set at every half second. Thus, the battery-conservation mode may also support a variety of different modes to further conserver the battery 120. A variety of other examples are also contemplated.

Example Device

Figure 6:
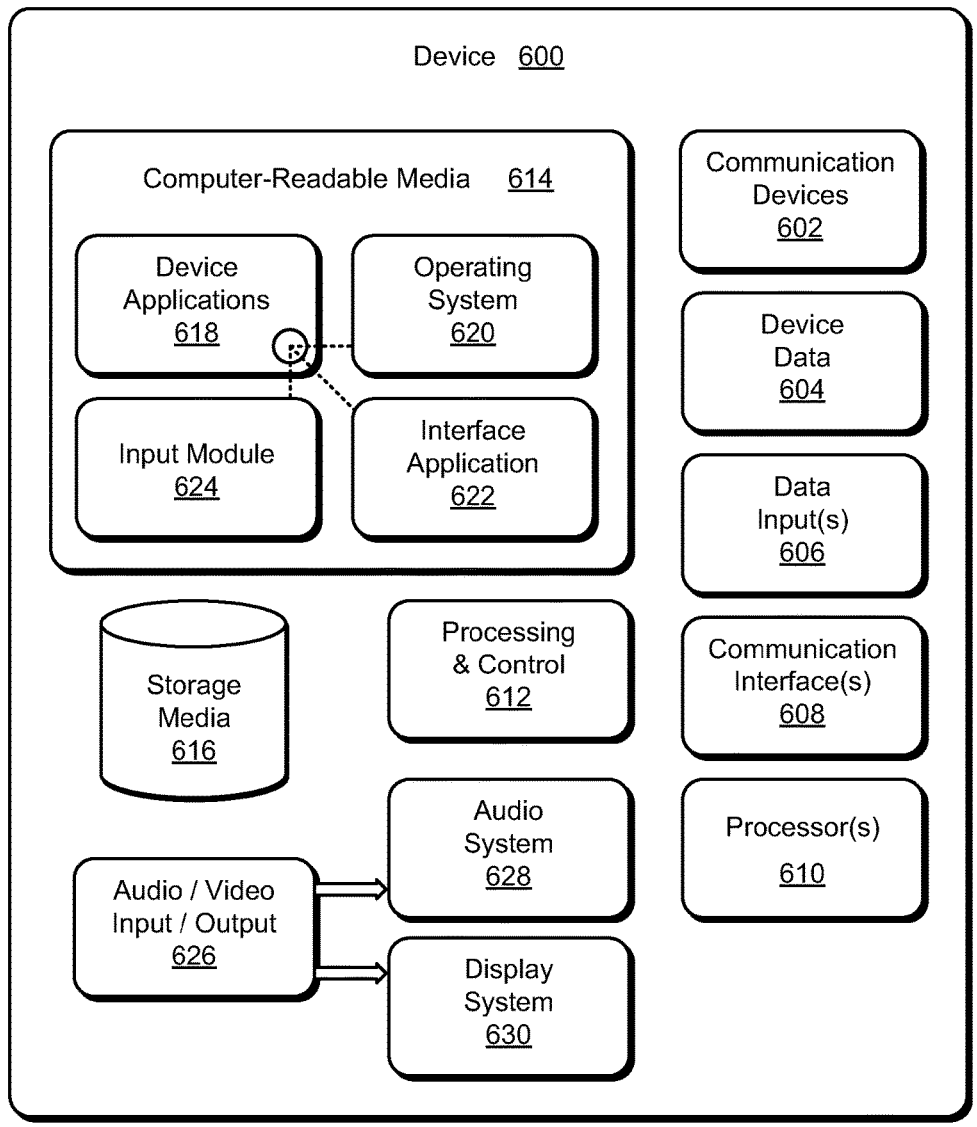
FIG. 6 illustrates various components of an example device that can be implemented as any type of portable and/or computer device as described with reference to FIGS. 1-4 to implement embodiments of the stylus mode techniques described herein.

FIG. 6 illustrates various components of an example device 600 that can be implemented as any type of portable and/or computer device as described with reference to FIGS. 1 and 2 to implement embodiments of the gesture techniques described herein. Device 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source.

Device 600 also includes communication interfaces 608 that can be implemented as any one or more o\f a serial and/or parallel interface, a wireless interface, any type of network interface, a modem, and as any other type of communication interface. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like) which process various computer-executable instructions to control the operation of device 600 and to implement embodiments described herein. Alternatively or in addition, device 600 can be implemented with any one or combination of hardware, firmware, or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable media 614 provides data storage mechanisms to store the device data 604, as well as various device applications 618 and any other types of information and/or data related to operational aspects of device 600. For example, an operating system 620 can be maintained as a computer application with the computer-readable media 614 and executed on processors 610. The device applications 618 can include a device manager (e.g., a control application, software application, signal processing and control module, code that is native to a particular device, a hardware abstraction layer for a particular device, etc.). The device applications 618 also include any system components or modules to implement embodiments of the gesture techniques described herein. In this example, the device applications 618 include an interface application 622 and an input module 624 (which may be the same or different as input module 114) that are shown as software modules and/or computer applications. The input module 624 is representative of software that is used to provide an interface with a device configured to capture inputs, such as a touchscreen, track pad, camera, and so on. Alternatively or in addition, the interface application 622 and the input module 624 can be implemented as hardware, software, firmware, or any combination thereof. Additionally, the input module 624 may be configured to support multiple input devices, such as separate devices to capture touch and stylus inputs, respectively. For example, the device may be configured to include dual display devices, in which one of the display device is configured to capture touch inputs while the other stylus inputs.

Device 600 also includes an audio and/or video input-output system 626 that provides audio data to an audio system 628 and/or provides video data to a display system 630. The audio system 628 and/or the display system 630 can include any devices that process, display, and/or otherwise render audio, video, and image data. Video signals and audio signals can be communicated from device 600 to an audio device and/or to a display device via an RF (radio frequency) link, S-video link, composite video link, component video link, DVI (digital video interface), analog audio connection, or other similar communication link. In an embodiment, the audio system 628 and/or the display system 630 are implemented as external components to device 600. Alternatively, the audio system 628 and/or the display system 630 are implemented as integrated components of example device 600.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. An apparatus comprising:
  a housing shaped to assume a form of a stylus;
  one or more touch sensors disposed proximal to the housing to detect the housing being one of grasped by a user or the housing being touched without being grasped;
  a circuit within the housing, the circuit configured to:
  distinguish between contact detected as the user grasping the housing, or the housing being touched without being grasped;
  based on detection by the one or more touch sensors of the contact by the user grasping the housing, enter an active mode to assist provision of one or more inputs to a computing device; and
  based on detection by the one or more touch sensors that the contact by the user has ceased, enter a battery-conservation mode to conserve battery power.

2. An apparatus as described in claim 1, wherein the active mode is operable to assist provision of one or more inputs to the computing device by improving an ability of the computing device to recognize a location of the stylus.

3. An apparatus as described in claim 1, wherein the active mode is operable to permit the stylus to communicate with the computing device using a radio.

4. An apparatus as described in claim 1, wherein the housing is shaped to assume the form of the stylus to be grasped by a hand of the user as a writing implement.

5. An apparatus as described in claim 1, wherein the battery-conservation mode supports a plurality of sub-modes, each said sub-mode having a different frequency at which the one or more touch sensors are utilized.

6. An apparatus as described in claim 1, wherein the one or more touch sensors utilize capacitive techniques.

7. An apparatus as described in claim 1, wherein the one or more touch sensors utilize resistive techniques.

8. An apparatus as described in claim 1, wherein the one or more touch sensors are operable to detect contact with the user while the user is wearing gloves to contact the one or more touch sensors.

9. An apparatus as described in claim 1, wherein the one or more touch sensors are disposed below a surface of the housing.

10. A method comprising:
using one or more touch sensors of a stylus to detect the stylus being one of grasped by a user or the stylus being touched without being grasped;
distinguishing between contact detected as the user grasping the housing, or the housing being touched without being grasped;
based on detection by the one or more touch sensors of the contact by the user grasping the housing, entering an active mode by the stylus to assist provision of one or more inputs to a computing device; and
responsive to detection by the one or more touch sensors of the stylus that the contact with the user has ceased, entering a battery-conservation mode by the stylus.

11. A method as described in claim 10, wherein the battery-conservation mode makes circuitry inactive that is configured to assist provision of one or more inputs to a computing device by improving an ability of the computing device to recognize a location of the stylus.

12. A method as described in claim 11, wherein the circuitry is a radio usable to communicate with a digitizer to provide XY coordinates.

13. A method as described in claim 10, wherein the active mode is operable to make circuitry active that is configured to assist provision of the one or more inputs to the computing device by improving an ability of the computing device to recognize a location of the stylus.

14. A method as described in claim 10, wherein the one or more touch sensors are positioned to avoid incorrect detection as a result of the stylus being disposed against a metallic object.

15. A method comprising:
entering an active mode by a stylus responsive to detection by one or more touch sensors of the stylus of contact with a user, the one or more touch sensors configured to distinguish between a touch input where the user is grasping the stylus as a writing implement and a touch input where the user is touching the stylus but is not grasping the stylus as a writing implement, the contact detected as the user grasping the stylus as a writing implement, the active mode configured to make functionality disposed within the stylus active that is operable to assist an ability of a computing device to recognize a location of the stylus; and
responsive to detection by the one or more touch sensors of the stylus that the contact with the user grasping the stylus as a writing implement has ceased, entering a battery-conservation mode by the stylus.

16. A method as described in claim 15, wherein the battery-conservation mode is configured to inactivate the functionality.

17. A method as described in claim 16, wherein the functionality includes a radio that is configured to communicate with the computing device.

18. A method as described in claim 11, wherein the one or more touch sensors utilize at least one of: resistive techniques, capacitive techniques, photographic techniques, positional techniques, pressure techniques, moisture impedance techniques, or capacitive impedance techniques.

19. A method as described in claim 10, wherein the battery-conservation mode supports a plurality of sub-modes, each said sub-mode having a different frequency at which the one or more touch sensors are utilized.

20. A method as described in claim 15, wherein the battery-conservation mode supports a plurality of sub-modes, each said sub-mode having a different frequency at which the one or more touch sensors are utilized.

* * * * *